United States Patent [19]

Suzuki et al.

[11] Patent Number: 5,157,549
[45] Date of Patent: Oct. 20, 1992

[54] AUTOMOTIVE HEADUP DISPLAY APPARATUS

[75] Inventors: Masao Suzuki; Tatsumi Ohtsuka; Kazuhiro Itami, all of Shizuoka, Japan

[73] Assignee: Yazaki Corporation, Tokyo, Japan

[21] Appl. No.: 665,839

[22] Filed: Mar. 7, 1991

[30] Foreign Application Priority Data

Mar. 9, 1990 [JP] Japan ............................ 2-23196[U]

[51] Int. Cl.⁵ .......................................... G02B 27/14
[52] U.S. Cl. ..................................... 359/633; 359/13; 359/630; 340/705
[58] Field of Search ...................... 359/13, 14, 15, 19, 359/630, 631, 632, 633, 634; 340/705

[56] References Cited

U.S. PATENT DOCUMENTS

| | | | |
|---|---|---|---|
| 3,940,204 | 2/1976 | Withrington | 359/19 |
| 4,457,579 | 7/1984 | Thylén | 359/13 |
| 4,582,394 | 4/1986 | Boyd | 359/13 X |
| 4,613,200 | 9/1986 | Hartman | 359/13 |
| 4,669,810 | 6/1987 | Wood | 359/631 X |
| 4,832,427 | 5/1989 | Nanba et al. | 350/3.72 |

FOREIGN PATENT DOCUMENTS

| | | |
|---|---|---|
| 3808406A1 | 4/1989 | Fed. Rep. of Germany . |
| 88926 | 5/1985 | Japan .................. 340/705 |
| 1574351 | 9/1980 | United Kingdom . |
| 2123657 | 2/1984 | United Kingdom . |
| 2163869 | 3/1986 | United Kingdom . |

Primary Examiner—Bruce Y. Arnold
Assistant Examiner—David R. Parsons
Attorney, Agent, or Firm—Nikaido, Marmelstein, Murray & Oram

[57] ABSTRACT

The automotive headup display apparatus contains an indicator and a reflection member and has an opening directed toward a reflection surface as on a windshield. A Fresnel lens is installed in the opening for enlarging a display image of the indicator. The reflection member is disposed facing and between the indicator and the reflection surface. The reflection member is coated with a hologram emulsion layer to have a wavelength selection capability such that only the rays of light with almost the same wavelength as display light of the indicator are reflected by the reflection membeer. With this arrangement, when external light should enter the indicator unit from the reflection surface on the windshield, those rays of light different in wavelength from the display light are not reflected toward the indicator, preventing the display of the indicator from being obscured as in the conventional apparatus.

3 Claims, 5 Drawing Sheets

AUTOMOTIVE HEADUP DISPLAY APPARATUS

BACKGROUND OF THE INVENTION

1. Field of the Invention

The present invention relates to an automotive headup display apparatus in which an image of the display is reflected by a reflecting surface on the windshield toward a driver's seat so that the display image can be seen within a driver's viewing field on the windshield.

2. Prior Art

An apparatus of this kind which is commonly available is shown in FIG. 8. In this apparatus, display light from an indicator unit 12 installed in the dashboard 11 is reflected by the windshield 13 toward a driver's seat so that a virtual image 15 of the display, when seen from the viewing point 14, can be seen within a driver's viewing field on the windshield 13. The driver therefore can look at the display such as vehicle speed without having to turn away his or her eyes from the viewing field on the windshield 13 while driving.

As shown in FIG. 9, the indicator unit 12 contains an indicator 121 and a reflecting mirror 122. In an opening directed toward the windshield 13, it also has a Fresnel lens 123 mounted in such a manner that the display surface 121a of the indicator 121 lies within a focal point of the lens. The reflecting mirror 122 for reflecting the light coming from the display surface is used to elongate the light path while reducing the size of the unit. The Fresnel lens 123 enlarges the image of the display so that the virtual image can be seen at a position farther than the indicator 121. That is, as shown in FIG. 8, the virtual image 15 is formed in front of the windshield 13 with respect to the forward driving direction, making it easy for a driver to quickly focus on the virtual image.

This kind of apparatus, however, has drawbacks. Since the apparatus utilizes the upper surface of the dashboard, external light as from the sun may enter the indicator, with the result that the display is easily obscured or washed out and the indicator is susceptible to deterioration. Particularly when sun rays directly enter the Fresnel lens 123, they are mostly converged on the display surface 121a of the indicator 121, significantly exacerbating the wash-out phenomena and the deterioration of the indicator.

SUMMARY OF THE INVENTION

The present invention has been accomplished to overcome the above drawbacks and its objective is to provide an automotive headup display apparatus which reduces unwanted effects of external light and thereby prevents the display from being washed out or obscured and the indicator from deteriorating.

To achieve the above objective, an automotive headup display apparatus comprises: an indicator unit installed in a dashboard, said indicator unit having an opening directed toward a reflection surface located in front of a driver's seat; an indicator contained in the indicator unit; and a reflection member contained in the indicator unit and positioned between the indicator and the reflection surface, said reflection member being adapted to selectively reflect light of almost the same wavelength as display light of the indicator; whereby a display image of the indicator is reflected by the reflection member toward the reflection surface which further reflects it toward a driver so that the driver can see the display image within a viewing field of the windshield.

In the automotive headup display apparatus of this invention, the display light from the indicator is reflected by the reflection member toward the reflection surface, which further reflects it toward a viewing point of a driver.

When external light is radiated against the reflection member, those rays with different wavelength from the display light are not reflected by the reflection member, thus reducing the intensity of external light reaching the indicator.

PREFERRED EMBODIMENTS OF THE INVENTION

Figure 1:
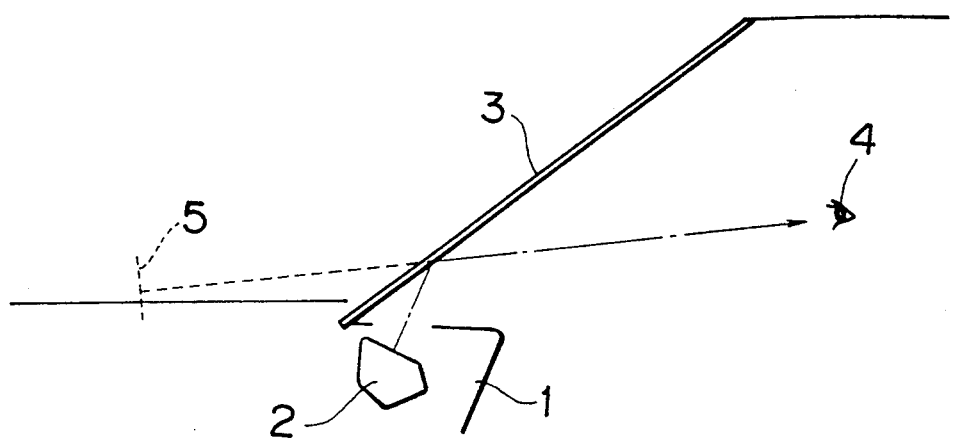
FIG. 1 is a schematic diagram showing an automotive headup display apparatus as a first embodiment of this invention.

FIG. 1 shows an automotive headup display apparatus as a first embodiment of the invention.

In the figure, reference numeral 1 represents a dashboard; 2 an indicator unit installed in the dashboard 1; 3 a windshield; and 4 a preset viewing point of a driver at the driver's seat. Display light from the indicator unit 2 is reflected by the windshield 3 toward the viewing point 4, as in the conventional headup display apparatus.

Figure 2:
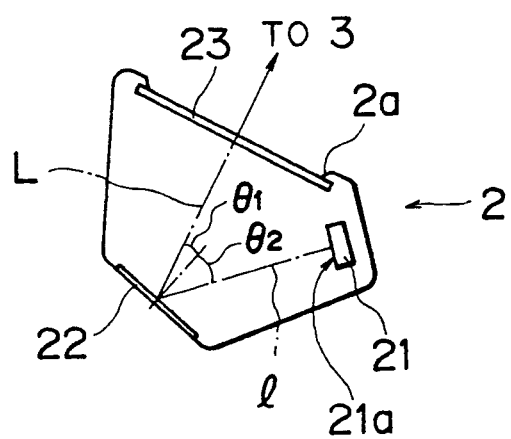
FIG. 2 is a schematic diagram showing an indicator unit employed in the first embodiment.

FIG. 2 shows the indicator unit 2. The indicator unit 2 contains an indicator 21 near the periphery of an opening 2a. It also contains a hologram mirror 22 as a reflecting member at a position facing the indicator 21 and the opening 2a. Installed in the opening 2a is a Fresnel lens 23 so set that its light axis L and a light axis l of the indicator 21 are in a non-regular reflecting relationship on the surface of the hologram mirror 22 ($\theta_1 \neq \theta_2$), which is described later.

Figure 3:
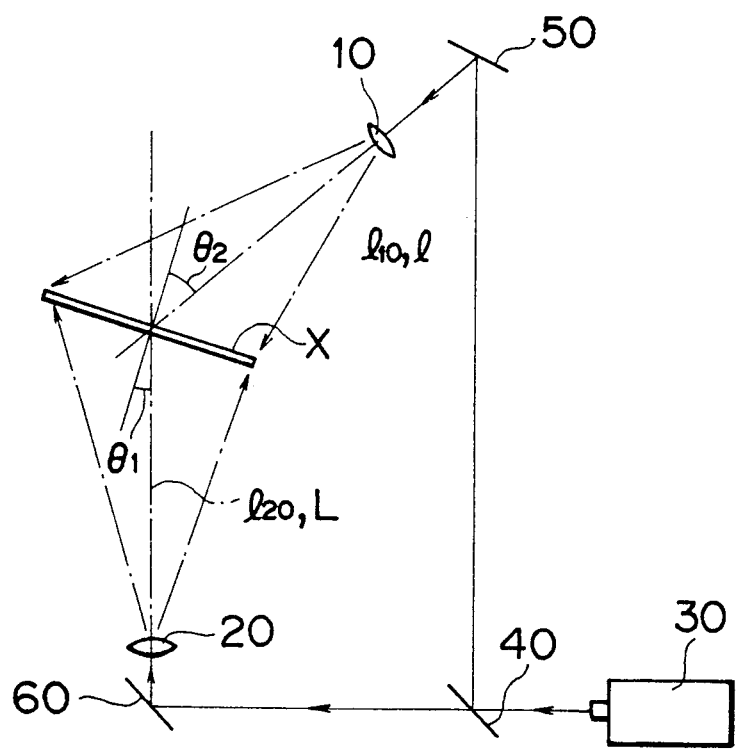
FIG. 3 is a schematic diagram showing the process of making a hologram mirror employed in the first embodiment.

The hologram mirror 22 consists of a transparent substrate such as glass plate coated on one side with a film of hologram emulsion such as dichromate gelatin photosensitive material. A hologram is recorded on this emulsion-coated photographic plate. The process of making the hologram mirror is explained by referring to FIG. 3.

A photographic plate X and the focus of a first diverging lens 10 are located at positions corresponding to the hologram mirror 22 and the display surface 21a of the indicator 21. A light axis $l_{10}$ of the first diverging lens 10 coincides with the light axis l of the indicator 21. The light axis $l_{10}$ is incident on the photographic plate X at an angle of $\theta_2$. A light axis $l_{20}$ of a second diverging lens 20 coincides with the light axis L of the Fresnel lens 23 and enters the photographic plate X at an incident angle of $\theta_1$. The second diverging lens 20 is so arranged that its focal point on the side opposite to the photographic plate X is located closer to the photographic plate X than a point corresponding to the focal point of the Fresnel lens 23.

A laser beam from a laser beam generator 30 is split in two directions by a beam splitter 40. The split laser beams are applied along the light axes of the first and second diverging lenses 10, 20 through mirrors 50, 60.

The laser beams which, after passing through the first and second diverging lenses 10, 20, have spherical wave fronts, are radiated against the front and back side of the photographic plate X to record a Lippmann type hologram thereon in the form of interference fringes layered along the thickness of the emulsion coated on the photographic plate X. After this, the photographic plate X is developed to produce the hologram mirror 22.

With this hologram mirror 22, light from a position corresponding to the focal point of the first diverging lens 10 is reflected intensified only at wavelengths complying with the conditions of Bragg reflection. The reflected light behaves as if it was radiated from a position corresponding to the focal point of the second diverging lens 20.

Figure 4:
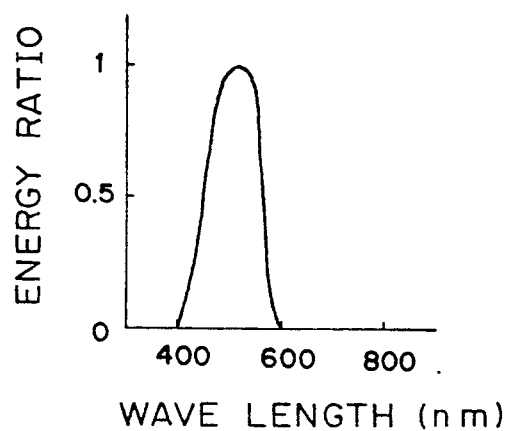
FIG. 4 is a graph showing a spectral characteristic of the indicator in the first embodiment.
Figure 5:
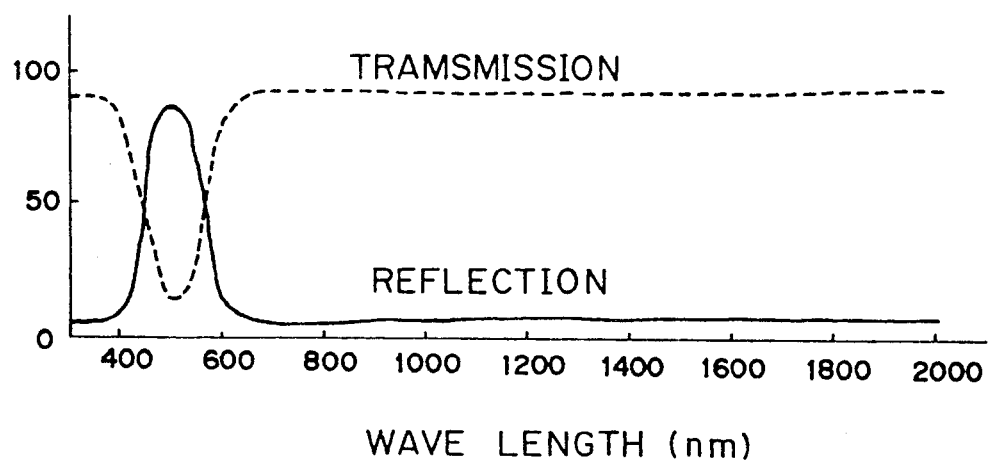
FIG. 5 is a graph showing a reflection characteristic and a transmission characteristic of the hologram mirror in the first embodiment.

The display light of the indicator 21 has a spectral characteristic as shown in FIG. 4, in which the highest energy level is assumed as 1 at 500 nm. The incident angle $\theta_2$, the reflection angle $\theta_1$ and the wavelength of the laser beam are so set that the display light of the indicator 21 is reflected wavelength-selectively according to the Bragg's reflection condition. The reflection and transmission characteristics of the hologram mirror 22 are as shown in FIG. 5.

As mentioned above, since the hologram mirror 22 reflects light in a non-regular reflection manner according to the Bragg's reflection condition and also has a wavelength selection capability, light from the indicator 21 is reflected by the hologram mirror 22 toward the Fresnel lens 23 as if it was radiated from within the focus of the Fresnel lens 23. The display light thus reflected is then enlarged by the Fresnel lens 23 to form the virtual image 5 in front of the windshield 3 (FIG. 1). Thus, an enlarged image of the display is obtained at a remote position from a driver.

Of the rays of external light entering the indicator unit 2 through the Fresnel lens 23, at least those reaching the indicator 21 are reduced in intensity by the wavelength selectivity of the hologram mirror 22, which in turn mitigates the wash-out phenomenon of the indicator 21. Since the hologram mirror 22 transmits infrared rays as indicated in FIG. 5, the indicator 21 can be protected against deterioration due to heat.

While, in the above embodiment, a hologram mirror is used as a reflecting member, the reflecting member of this invention may be formed of any other material if it selectively reflects display light of a particular wavelength. The reflecting surface for forming a virtual image may be other than the windshield, such as a half-mirror mounted on a dashboard.

Figure 6:
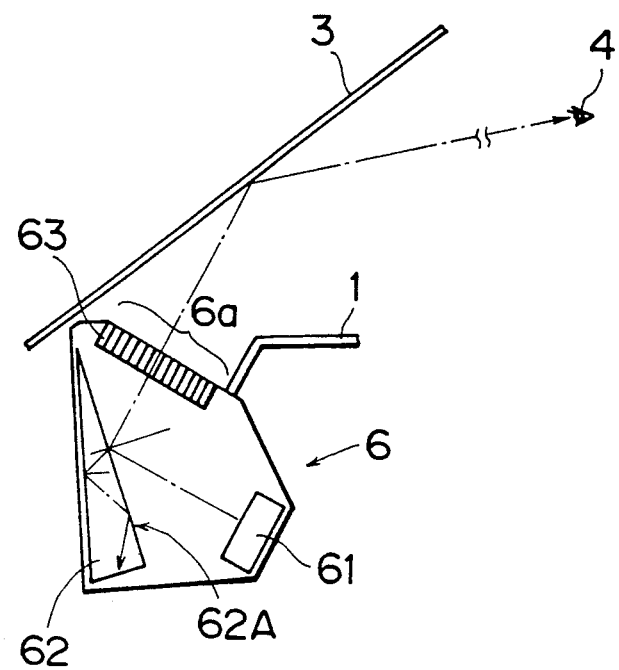
FIG. 6 is a schematic diagram showing an automotive headup display apparatus as a second embodiment of this invention.

FIG. 6 shows a second embodiment of the automotive headup display apparatus according to this invention, with parts identical with those of FIG. 1 assigned like reference numerals.

In FIG. 6, designated 6 is an indicator unit installed in the dashboard 1. The display light from the indicator unit 6 is reflected by the windshield 3 toward the viewing point 4.

The indicator unit 6 contains an indicator 61 and a prism 62 and also has a louver 63 mounted in an opening 6a as a member to restrict the direction of light passing therethrough.

The display light of the indicator 61 has a spectral characteristic similar to that of FIG. 4. Of two faces of the prism 62 adjoining at a prism angle, a first face 62A on the side of the indicator 61 is coated by metal vapor deposition with a filter layer, which has reflection and transmission characteristics similar to those of FIG. 5. The first face 62A selectively reflects the display light of the indicator 61.

The display light from the indicator 61 is reflected by the first face 62A of the prism 62 and directed through the louver 63 toward the windshield 3 so that the display can be seen from the viewing point 4.

Figure 7:
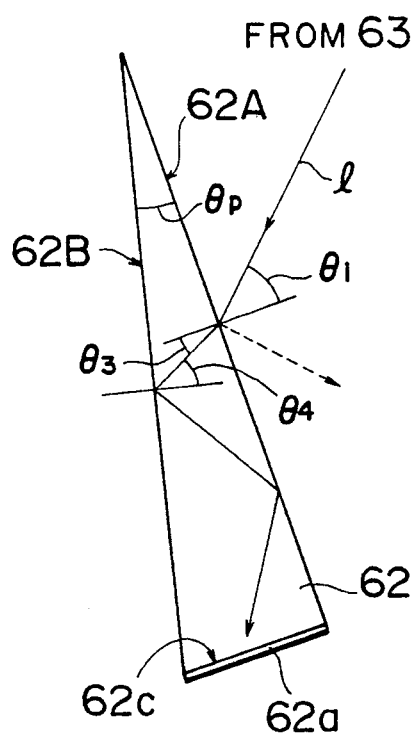
FIG. 7 is a schematic diagram showing the action of a prism employed in the second embodiment.
Figure 8:
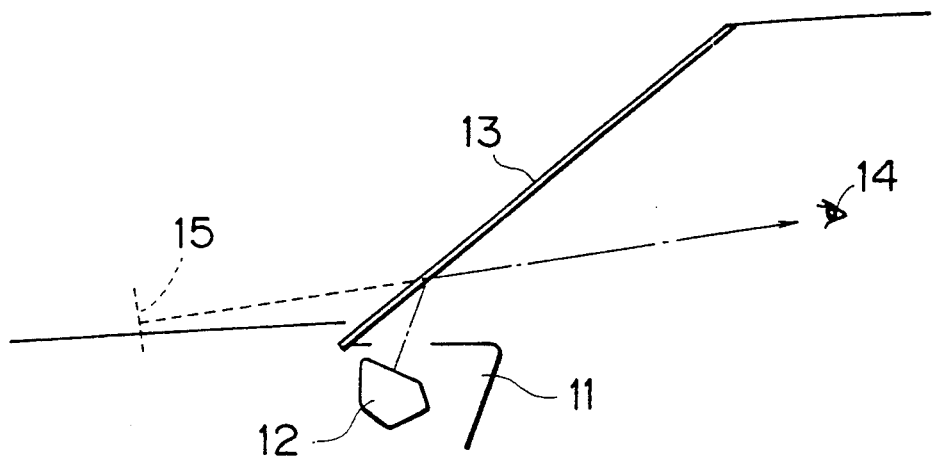
FIG. 8 is a schematic diagram showing one example of a conventional automotive headup display apparatus.
Figure 9:
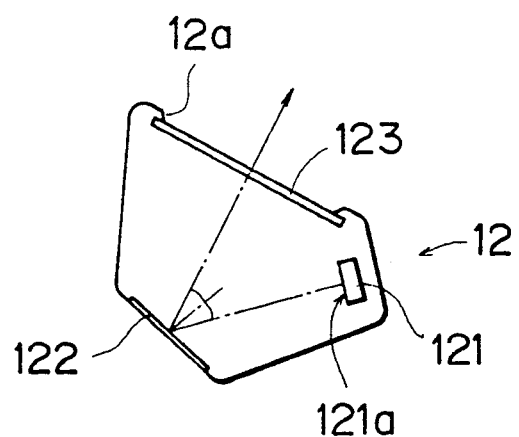
FIG. 9 is a schematic diagram showing an indicator unit employed in the conventional automotive headup display apparatus of FIG. 8.

FIG. 7 is a diagram showing the action of the prism 62. The prism angle $\theta_P$ at the apex defined by the first face 62A and the second face 62B is so set that after the light l is restricted in direction by the louver 63 as it passes therethrough and then is refracted by the first face 62A of the prism 62, the refracted light is totally reflected by the second face 62B. The prism 62 also has a third face 62C which is applied with dark non-reflective coating to form a light absorbing layer 62a. As shown in the figure, if we let $\theta_i$ stand for an angle of incidence on the first face 62A, $\theta_3$ for an angle of refraction, $\theta_4$ for an angle of incidence when the light is totally reflected on the second face 62B, and n for a refractive index of the prism 62, then the following relationships hold.

$$\theta_4 \geq \sin^{-1}\left[\frac{1}{n}\right]$$

$$\theta_3 = \sin^{-1}\left[\frac{\sin\theta_i}{n}\right]$$

$$\theta_p = \theta_4 - \theta_3$$

Of the rays of external light entering the prism 62 from the windshield 3 through the louver 63, those refracted by the first face 62A of the prism 62 are totally reflected by the second face 62B and then the first face 62A to reach the third face 62C, where it is absorbed by the light absorbing layer 62a on the third face 62C.

The rays that are reflected by the first face 62A and reach the indicator 61 (shown by a one-dot line) are attenuated by the wavelength selectivity of the first face 62A, mitigating the wash-out phenomena of the indicator. Furthermore, like the hologram mirror 22 of the first embodiment, the first face 62A of the prism 62 passes infrared rays, so that the indicator 61 can be prevented from deteriorating due to heat.

In the above embodiment, since the louver 63 restricts the range of incidence angle of external light, the amount of external light entering the prism 62 is effectively reduced. Without this louver, the similar effect can still be obtained by the wavelength selectivity of the first face 62A of the prism 62.

With the automotive headup display apparatus of this invention, a reflecting member which selectively reflects rays of light of almost the same wavelengths as the display light of the indicator is installed between the indicator and a reflecting surface such as windshield so that the display image of the indicator is reflected toward the reflecting surface. In this construction, if external light enters into the indicator unit and strikes the reflecting member, those rays different in wavelength from the display light are not reflected by the reflecting member, thus reducing the intensity of the external light that strikes the indicator. In this way, the headup display of this invention is capable of reducing the adverse effects of external light and thereby prevent the display from being obscured and the indicator from deteriorating.

What is claimed is:

1. An automotive headup display apparatus comprising:
    an indicator unit installed in a dashboard, said indicator unit having an opening directed toward a reflection surface located in front of a driver's seat;
    an indicator contained in said indicator unit, said indicator providing a display light in the form of a display image, said display light having a particular wavelength; and
    a reflection member contained in the indicator unit and positioned to reflect light from the indicator to the reflection surface, said reflection member being adapted to selectively reflect light of substantially the same wavelength as the wavelength of the display light of the indicator, said reflection member comprising a prism whose first face includes wavelength selection means to selectively reflect light of substantially the same wavelength as the wavelength of the display light of the indicator, the first face of the prism reflects the display image of the indicator toward the reflection surface, and a prism angle between the first face and a second face is so set that light entering the first face from the reflection surface side is refracted by the first face and then totally reflected by the second face;
    whereby the display image of the indicator is reflected by said reflection member toward the reflection surface which further reflects the display image toward a driver so that the driver can see the display image within a viewing field of a windshield.

2. An automotive headup display apparatus as claimed in claim 1, wherein said prism has a third face coated with a light absorbing layer.

3. An automotive headup display apparatus as claimed in claim 1, further comprising a light direction restricting member disposed between the prism and the reflection surface to limit a range of direction in which light enters the prism from the reflection surface side.

* * * * *